US006704984B2

(12) United States Patent
Szewc et al.

(10) Patent No.: US 6,704,984 B2
(45) Date of Patent: Mar. 16, 2004

(54) PREWINDER APPARATUS FOR INSTALLATION TOOLS

(75) Inventors: Jan Szewc, Danbury, CT (US); William J. Lutkus, Watertown, CT (US); William Giannakakos, Danbury, CT (US)

(73) Assignee: Newfrey LCC, Newark, DE (US)

( * ) Notice: Subject to any disclaimer, the term of this patent is extended or adjusted under 35 U.S.C. 154(b) by 0 days.

(21) Appl. No.: 09/918,630

(22) Filed: Jul. 31, 2001

(65) Prior Publication Data

US 2003/0024594 A1 Feb. 6, 2003

(51) Int. Cl.[7] ................................................ B23P 19/04
(52) U.S. Cl. ...................................................... 29/240.5
(58) Field of Search ................................ 140/122, 123, 140/124; 29/240.5

(56) References Cited

U.S. PATENT DOCUMENTS 2,390,545 A 12/1945 Lang
2,400,548 A * 5/1946 Geertsema ................ 29/240.5
2,586,805 A 2/1952 Forster
2,594,901 A 4/1952 Forster
3,111,751 A 11/1963 Eddy
3,579,793 A * 5/1971 Williams et al. ........... 29/240.5
4,172,314 A 10/1979 Berecz et al.
4,553,302 A 11/1985 Cosenza et al.
4,553,303 A 11/1985 Yamamoto
4,645,398 A 2/1987 Cosenza et al.
4,980,959 A 1/1991 Czarnowski
5,214,831 A 6/1993 Collins, Jr. et al.
5,309,617 A 5/1994 Dannar
5,456,145 A 10/1995 Cosenza
6,171,040 B1 1/2001 Sato

* cited by examiner

*Primary Examiner*—Lowell A. Larson
(74) *Attorney, Agent, or Firm*—Harness, Dickey & Pierce, P.L.C.

(57) ABSTRACT

A prewinder apparatus for selective attachment to an installation tool is provided. The prewinder apparatus includes a support structure selectively attachable to the installation tool, a prewinder attached to the support structure, the prewinder having first and second threaded apertures, and a mandrel having a threaded end and a coupling end. The threaded end is in threaded engagement with the second threaded aperture. The coupling end is in selective operable engagement with the drive tool, whereby the drive tool rotatably drives the mandrel relative to the prewinder for rotatably driving the helical coil insert through the second threaded aperture to prewind the helical coil insert.

26 Claims, 5 Drawing Sheets

PREWINDER APPARATUS FOR INSTALLATION TOOLS

FIELD OF THE INVENTION

The present invention relates to prewinding tools for installing helical coil inserts into tapped holes, and more particularly to a prewinding apparatus selectively attachable to an installation tool.

BACKGROUND OF THE INVENTION

Helical coil inserts are commonly installed into tapped holes of a work piece so that threaded fasteners, such as screws, can be held more securely. These inserts provide a female thread of a harder material than the material of the original threaded hole, into which they are installed. In other words, the inserts improve the gripping of threaded fasteners made of relatively hard materials, such as various steel alloys, when installed in relatively soft parent materials, such as aluminum. Helical coil inserts typically include a tang used as a grip by a mandrel of the installation tool for screwing the helical coil insert into the tapped hole.

Helical coil inserts of this kind are usually installed by pre-winding then to reduce their diameter, and then rotatably threading them into a tapped hole. Once installed, the inserts expand from their contracted diameters and press radially outward against the walls defining the tapped holes, whereby the insert is securely held in place. Various tool are provided for performing this function, however, these typically are limited to larger single-function tools such as those driven by an air or electric motor. Such tools further include a tubular body having a threaded bore extending along its axis and an opening at one end of the body for placing the insert in the bore. A mandrel is rotated by the motor within the threaded bore and into engagement with the insert. Advancement of the mandrel forces the insert through a prewinder, which contracts the insert prior to advancement into a tapped hole in an adjacent work piece. Once the insert is installed at the correct depth in the bore of the work piece, the mandrel is reversed until it is removed from the insert. Upon removal of the mandrel, the insert expands radially to engage the wall of the tapped hole.

As mentioned above, such installation tools are generally dedicated tools performing the functions of prewinding and installing inserts. In order to perform these functions a special prewinder tool must be purchased. In all manufacturing environments, there is a continuous drive to reduce costs. Having to purchase special tools to perform specific functions significantly increases costs. Therefore, it is desirable in the industry to provide a prewinder apparatus that is adaptable for operation with an existing tool. In this manner, the number of tools may be reduced and ease of use may be improved, thereby significantly reducing overall costs.

SUMMARY OF THE INVENTION

Accordingly, the present invention provides a prewinder apparatus selectively attachable to a drive tool for prewinding a helical coil insert. The prewinder apparatus includes a support structure selectively attachable to the drive tool and a prewinder attached to an end of the support structure. The prewinder includes first and second threaded apertures and a mandrel preferably having a threaded end and a coupling end. The threaded end engages the first threaded aperture and selectively engages the second threaded aperture. The coupling end is in selective operable engagement with the drive tool, whereby the drive tool rotatably drives the mandrel relative to the prewinder. Specifically, the mandrel rotatably drives the helical coil insert through the second threaded aperture to prewind the helical coil insert.

In a first preferred embodiment, the prewinder apparatus is a reciprocating mandrel prewinder apparatus. This reciprocating-mandrel prewinder apparatus includes a drive sleeve having a main body with a coupling stem in selective engagement with the drive tool and a cavity for slidably receiving the coupling end of the mandrel therein. The coupling end includes a radially extending pin slidably disposed within a slot running along a length of the drive sleeve. The drive sleeve is rotatably driven by the drive tool for reciprocally driving the mandrel within the prewinder apparatus. The reciprocating mandrel prewinder apparatus preferably includes a pair of adjustable stops operably engageable with the drive sleeve to define a range of sliding motion of the mandrel relative thereto.

In a second preferred embodiment, the prewinder apparatus is a stationary mandrel prewinder apparatus. The mandrel of the stationary-mandrel prewinder apparatus is rotatably driven by the drive tool, thereby reciprocally driving the support structure of the stationary-mandrel prewinder apparatus relative to the drive tool. For facilitating movement of the support structure, the support structure includes a slot for slidably engaging the drive tool. The stationary-mandrel prewinder apparatus preferably includes an adjustable stop, which is adjustable along a length of the mandrel to define a range of sliding motion of the support structure relative to the drive tool.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

With reference to FIGS. 1A–3 the present invention provides first and second preferred embodiments of a prewinder apparatus 10,200 respectively, selectively attachable to a drive tool 12. The prewinder apparatus 10,200 is provided as an installation tool for installing helical wire inserts into a threaded opening. The drive tool 12 is preferably an electric tool, such as an electric screwdriver, a variable speed drill and the like. Further, it is anticipated that the drive tool 12 may be either a corded or cordless (i.e. battery powered) tool.

Figure 1A:
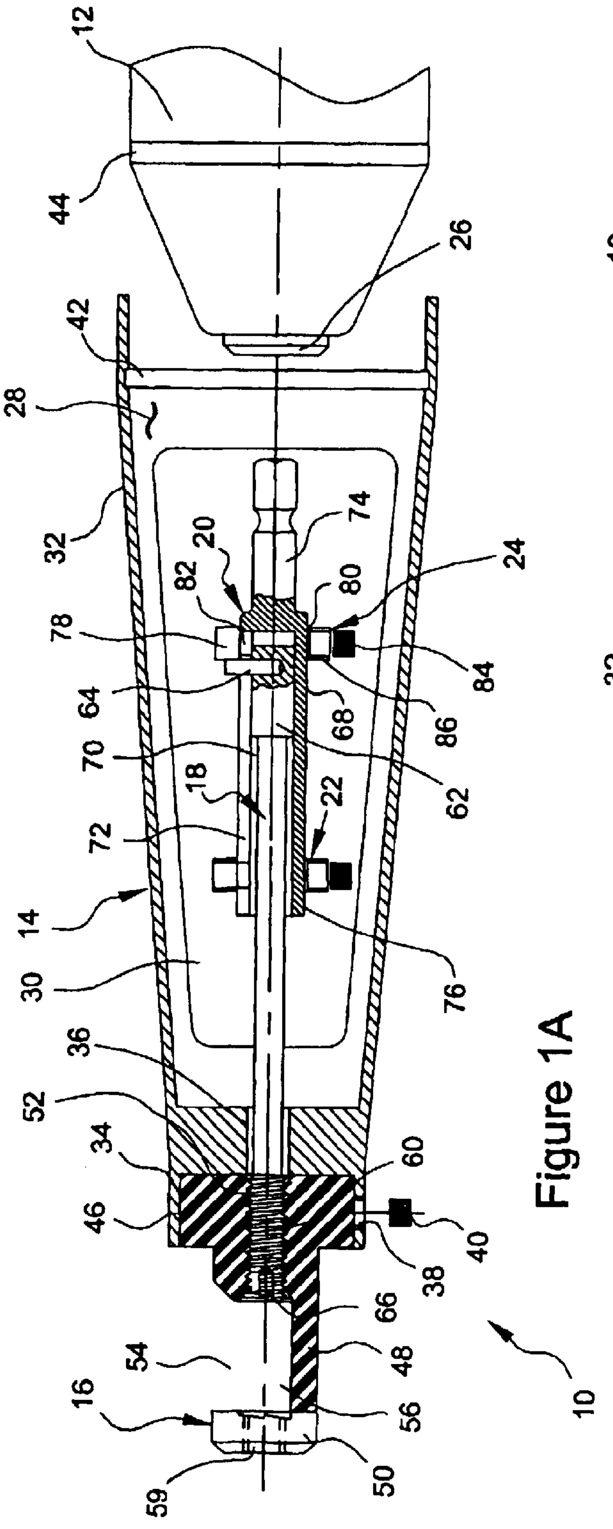
FIG. 1A is a side cross-sectional view of a reciprocating-mandrel prewinder apparatus in accordance with the principles of the present invention.
Figure 1B:
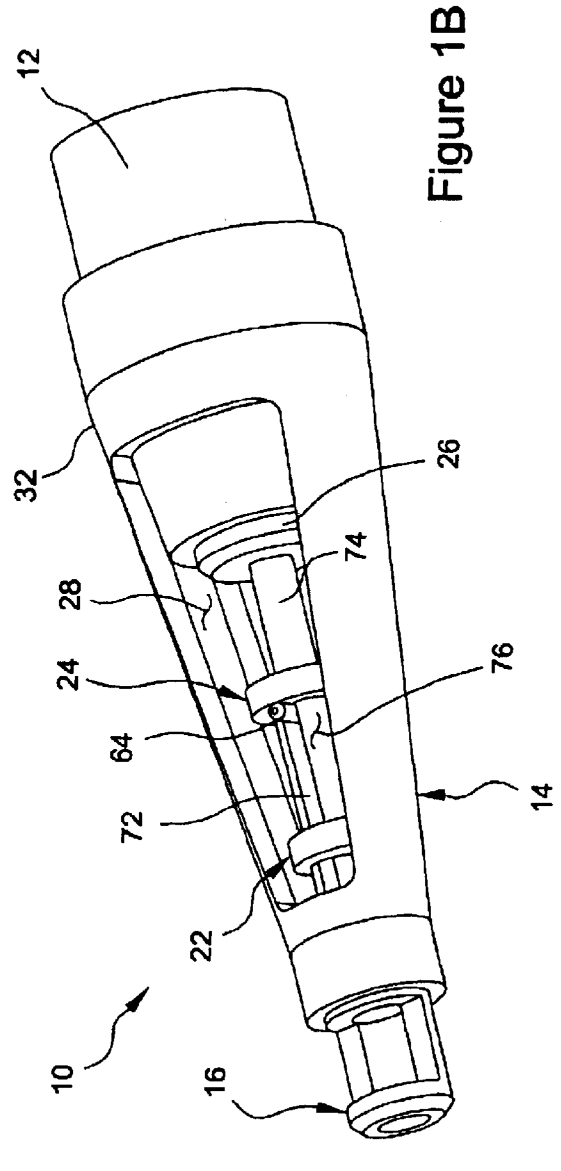
FIG. 1B is a perspective view of the reciprocating-mandrel prewinder apparatus of FIG. 1A.

With particular reference to FIGS. 1A and 1B, the present invention provides a reciprocating mandrel prewinder apparatus 10, including a support structure 14, a prewinder 16, a mandrel 18, a drive sleeve 20 and a pair of adjustable stops 22, 24. The prewinder 16 is disposed in an end of the support structure 14 and the mandrel 18 is rotatably disposed therethrough. The mandrel 18 is operatively interconnected to the drive sleeve 20 and axially moveable therein. The adjustable stops 22, 24 are disposed about the drive sleeve 20 and are adjustable relative thereto for limiting the axial movement of the mandrel 18 relative to the drive sleeve 20. The support structure 14 is selectively interconnected to an end of the drive tool 12, whereby the drive sleeve 20 is interconnected with a drive unit 26 of the drive tool 12 for driving the mandrel 18.

In a first embodiment, the support structure 14 is generally frusto-conical in shape having a frusto-conical cavity 28. A slot 30 is provided through a wall 32 of the support structure 14 for accessing components disposed therein. A distal end of the support structure 14 includes a cylindrical cavity 34 having an aperture 36 extending to the frusto-conical cavity 28. A threaded aperture 38 is also provided and radially extends from the cylindrical cavity 34 through the support structure 14 for receiving a setscrew 40 therein. An open end of the support structure 14 includes a circumferential groove 42 for engaging a circumferential mating lip 44 disposed about the drive tool 12. In this manner, the support structure 14, and thus the prewinder apparatus 10, may be easily interconnected with the drive tool 12.

Figure 4:
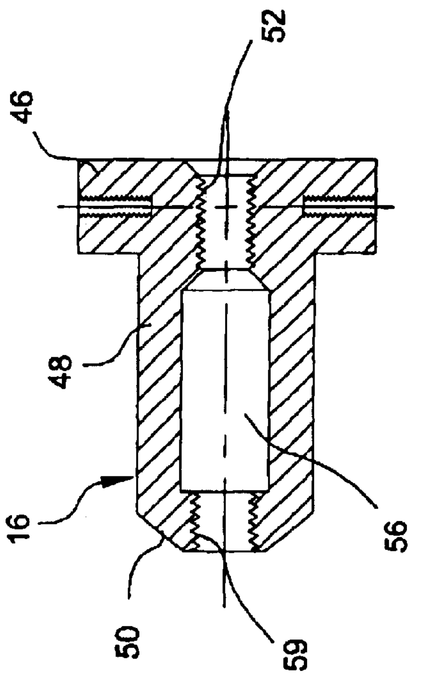
FIG. 4 is a detailed cross-sectional view of a prewinder of the reciprocating-mandrel prewinder apparatus shown in either of FIGS. 1 and 2.

With particular reference to FIG. 4, the prewinder 16 includes a foot 46, a semi-cylindrical intermediate body 48 and a leading end 50. The foot 46 is received into the cylindrical cavity 34 of the support structure 14 and includes a first threaded aperture 52 therethrough. The semi-cylindrical intermediate body 48 connects the foot 46 and leading end 50, and provides a slot 54 (see FIG. 1A) providing access to a semi-circular recess 56, whereby a user can load a helical coil insert 58 (see FIG. 5) into the prewinder 16. The leading end 50 includes an aperture 59, which is a reduced diameter aperture for providing a prewinding aperture, as explained in further detail hereinbelow. The prewinder 16 is mounted to the support structure 14 by inserting the foot 46 into the cylindrical cavity 34. The prewinder 16 is held in place by the setscrew 40.

Again referencing FIGS. 1A and 1B, the mandrel 18 is generally cylindrical along its length and includes a threaded leading end 60 and an opposing end 62 having a pin 64 extending radially therefrom. The threaded leading end 60 includes a contour 66 for engaging the helical coil insert 58 and is slidably disposed through the aperture 36 of the support structure 14. Further, the mandrel 18 is in threaded engagement with the first threaded aperture 52 of the prewinder 16. As the mandrel 18 is caused to rotate, as described in further detail hereinbelow, it is drawn axially through the first threaded aperture 52, as a result of the threaded engagement therebetween.

The drive sleeve 20 includes a generally cylindrical housing 68 having a cavity 70 disposed axially therein and a slot 72 running along the length of the housing 68. A generally hexagonal stem 74 axially extends from an end of the drive sleeve 20. It will be appreciated that, although the stem 74 is provided herein as generally hexagonal, other geometries may be readily substituted therefor. The hexagonal stem 74 is receivable into the drive unit 26 of the drive tool 12 to enable the drive tool 12 to rotatably drive the drive sleeve 20. The mandrel 18 is axially received into the cavity 70 of the drive sleeve 20, whereby the radially extending pin 64 extends into the slot 72 of the mandrel 18. In this manner, the drive sleeve 20 and mandrel 18 are fixed for concurrent rotation while the mandrel is axially slidable within the cavity 70 of the drive sleeve 20.

Each adjustable stop 22, 24 is disposed about an outside circumferential surface 76 of the drive sleeve 20 include a ring-shaped body 78 having an aperture 80 therethrough and a guide 82 extending radially inward. The drive sleeve 20 extends through the aperture 80, whereby the guide 82 is slidably received into the slot 72 of the drive sleeve 20. Each adjustable stop 22, 24 is slidable along the drive sleeve 20 until a desired position is achieved. Further, each adjustable stop 22, 24 includes a setscrew 84 disposed through a threaded aperture 86 of the ring-shaped body 78. The setscrews 84 are operable to lock the adjustable stops 22, 24 relative to the drive sleeve 20. As the mandrel 18 slides axially within the drive sleeve 20, the radially extending pin 64 ultimately contacts one of the adjustable stops 22, 24, prohibiting further sliding of the pin 64 within the slot 72. In this manner, the length of sliding motion of the mandrel 18 within the drive sleeve 20 may be selectively defined via adjustment of the adjustable stops 22, 24. As a result, the depth that the helical coil insert 58 is installed is controlled and may be varied as particular design requirements dictate.

Figure 2A:
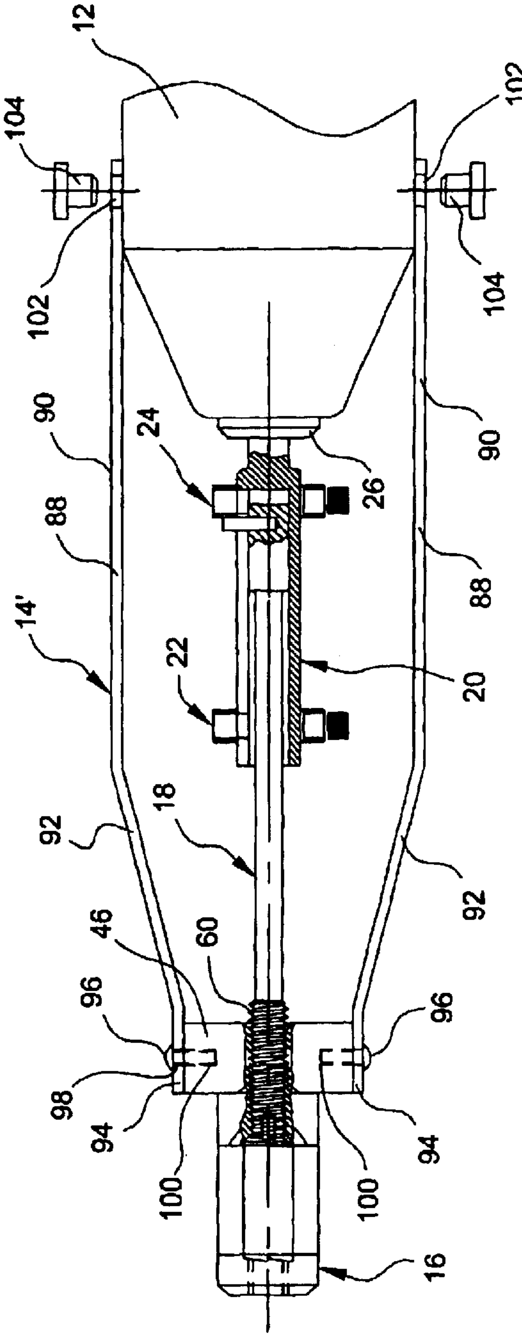
FIG. 2A is a side, partial cross-sectional view of an alternative embodiment of the reciprocating-mandrel prewinder apparatus of FIGS. 1A and 1B.
Figure 2B:
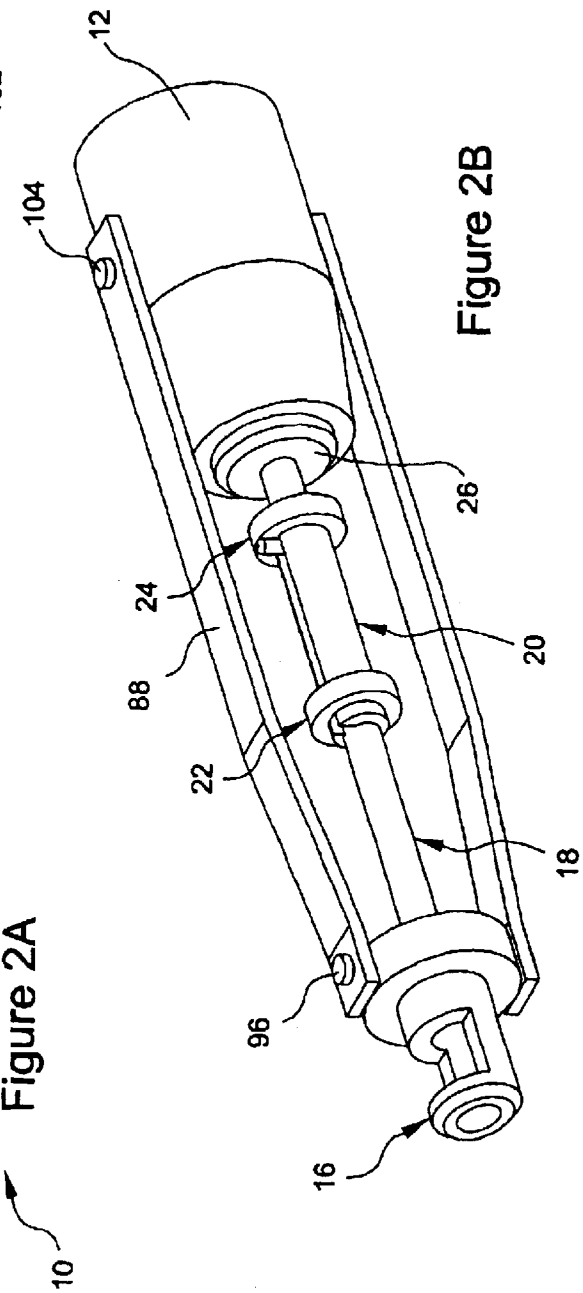
FIG. 2B is a perspective view of the alternative embodiment of the reciprocating-mandrel prewinder apparatus of FIG. 2A.

With reference to FIGS. 2A and 2B, an alternative support structure is provided as a bracket assembly 14'. The bracket assembly 14' includes brackets 88, each including a straight portion 90, an angular step portion 92 and an end portion 94. The foot 46 of the prewinder 16 is received in the end portions 94 of the bracket 88 and is retained in position by a pair of screws 96 that are received through apertures 98 of the end portion 94 and are in threaded engagement with a pair of threaded apertures 100 of the foot 46 of the prewinder 16. A distal end of the portion 90 of each bracket 88 includes an aperture 102 for receiving a bolt 104 therethrough to retain the prewinder apparatus 10 on the drive tool 12.

Figure 5:
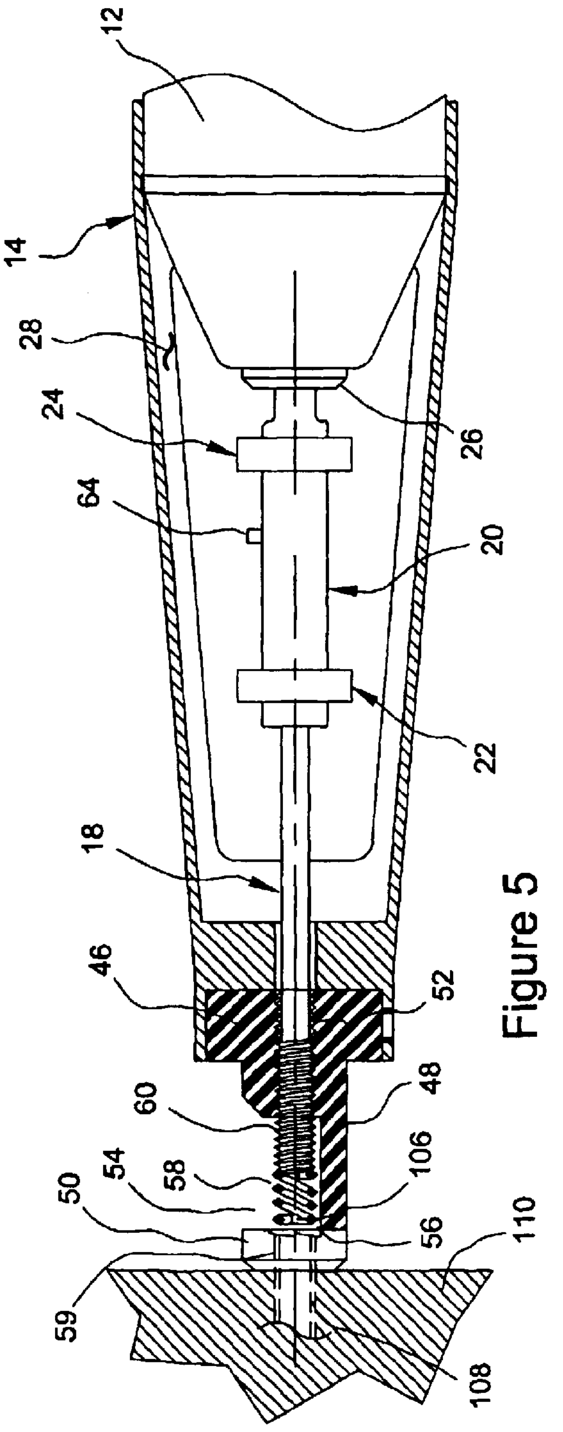
FIG. 5 is a side view of the reciprocating-mandrel prewinder apparatus of FIG. 1 during a prewinding operation.

With reference to FIG. 5, operation of the prewinder apparatus 10 will be described in detail. The helical coil insert 58 is placed within the semi-circular recess 56 of the semi-cylindrical intermediate body 48 through the slot 54, and is aligned with the prewinder aperture 59 of the leading end 50 of the prewinder 16. To accommodate loading of the helical coil insert 58 into the prewinder, initially, the mandrel 18 is partially retracted into the first threaded aperture 52 of the foot 46. Subsequent actuation of the drive tool 12 causes the drive unit 26 to rotatably drive the drive sleeve 20, thereby rotatably driving the mandrel 18. As the mandrel 18 rotates, the threaded engagement with the first threaded aperture 52 of the foot 46 causes the mandrel 18 to move axially, eventually engaging the helical coil insert 58. Upon engagement, the threaded leading end 60 of the mandrel 18 slides through the helical coil insert 58 until the contour 66 grabs a tang 106 of the helical coil insert 58. The mandrel 18 rotates the helical coil insert 58 into the prewinder aperture 59 of the leading end 50, thereby prewinding the helical coil insert 58 about leading end 60 of the mandrel 18. Continued advancement of the mandrel 18 causes the pre-wound, helical coil insert 58 to axially move from the prewinder aperture 59 into a threaded bore 108 of a work piece 110. Upon complete insertion of the helical coil insert 58 within the threaded bore 108, the driving action of the drive tool 12 is reversed to disengage the contour 66 from tang 106 and withdraw the mandrel 18 from the insert 58 and bore 108.

Figure 3:
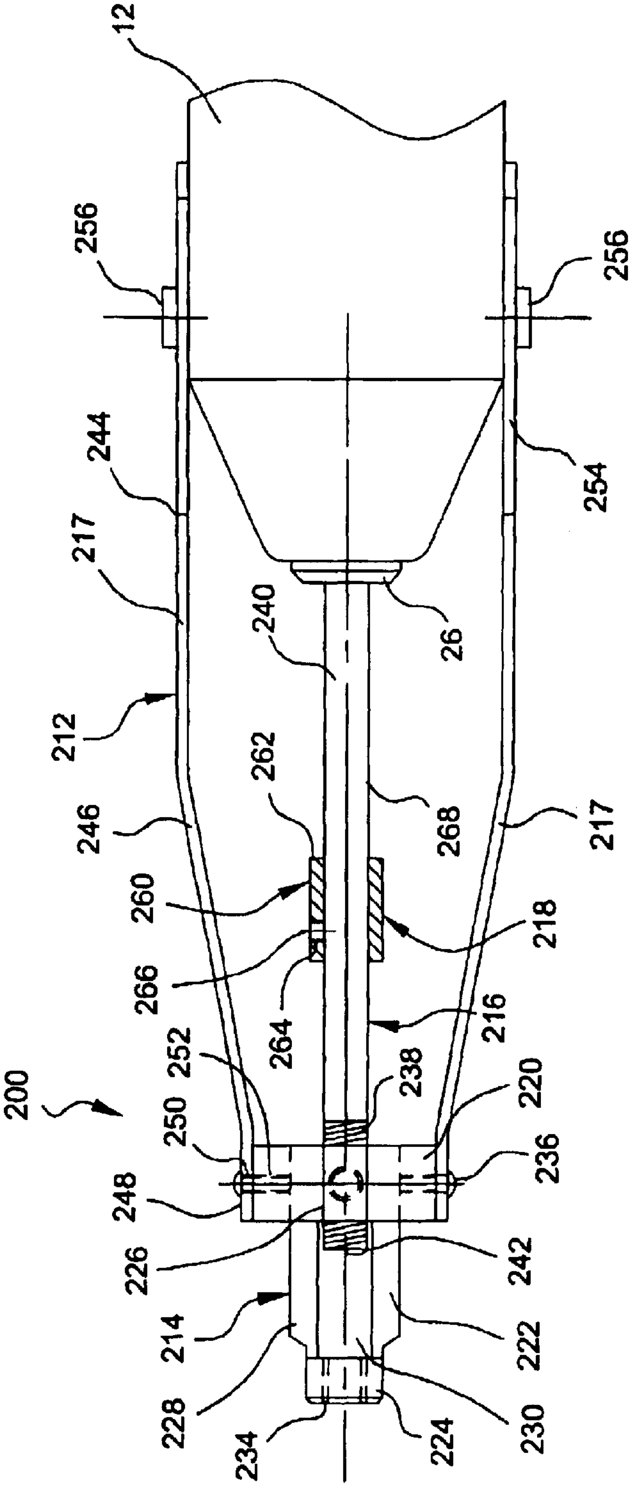
FIG. 3 is a side view of a stationary-mandrel prewinder apparatus in accordance with the principles of the present invention.

With particular reference to FIG. 3, the present invention also provides a stationary mandrel prewinder apparatus 200, including a bracket assembly 212, a prewinder 214, and a mandrel 216. The prewinder 214 is held between the brackets 217 of the bracket assembly 212 and the mandrel 216 is rotatably disposed therethrough. The mandrel 216 is operatively interconnected to the drive tool 12. An adjustable stop 218 is provided and is disposed about the mandrel 216. The adjustable stop 218 is adjustable relative to the mandrel 216 for limiting movement of the prewinder apparatus 200 relative to the drive tool 12.

The prewinder 214 is similar to the prewinder 16 described hereinabove and includes a foot 220, a semi-cylindrical intermediate body 222 and a leading end 224. The foot 220 is adapted for reception between the brackets 217 of the bracket assembly 212 and includes a first threaded aperture 226 therethrough. The semi-cylindrical intermediate body 222 interconnects the foot 220 and leading end 224, and provides a slot 228 for accessing an arcuate recess 230 for loading a helical coil insert 232 (see FIG. 6) into the prewinder 214. The leading end 224 includes an aperture 234, which is of a reduced diameter for providing a prewinding aperture 234, as explained in further detail hereinbelow. The prewinder 214 is mounted to the bracket assembly 212, whereby the foot 220 is secured by a pair of screws 236.

The mandrel 216 is generally cylindrical along its length and includes a threaded leading end 238 and an opposing stem end 240. The stem end 240 is generally hexagonal, although, it will be appreciated that other geometries may be readily substituted therefor. The hexagonal stem 240 is received into the drive unit 26 of the drive tool 12, as described for the prewinder apparatus 10 above, to enable the drive tool 12 to rotatably drive the mandrel 216. The threaded leading end 238 includes a contour 242 for engaging the helical coil insert 232. Further, the mandrel 216 is in threaded engagement with the first threaded aperture 226 of the prewinder 214. As the mandrel 216 is caused to rotate, as described in further detail hereinbelow, the prewinder 214 is drawn axially about the mandrel 216 as a result of the threaded engagement therebetween. In this manner, the mandrel 216 remains stationary relative to the drive tool 12 and the prewinder 214 moves axially relative thereto.

The bracket assembly 212 is similar to the bracket assembly 14' described hereinabove and includes the brackets 217. Each bracket 217 includes a straight portion 244, an angular step portion 246 and an end portion 248. The foot 220 of the prewinder 214 is received between the end portions 248 of the brackets 217 and is retained in position by the screws 236 that are received through apertures 250 of the end portions 248 and are in threaded engagement with a pair of threaded apertures 252 of the foot 220 of the prewinder 214. A distal end of the straight portion 244 of each bracket 217 includes a slot 254 for receiving bolts 256 therethrough to slidably retain the prewinder apparatus 200 on the drive tool 12. The slots 254, enable the bracket assembly 212 to slide axially relative to the drive tool 12.

The adjustable stop 218 includes a cylindrical body 260 having a cylindrical cavity 262 disposed therethrough and a radial threaded aperture 264 for receiving a setscrew 266 therein. The mandrel 216 is slidably received through the cylindrical cavity 262 and the adjustable stop 218 is locked in position along a length of the mandrel 216 by engagement of the setscrew 266 with a circumferential surface 268 of the mandrel 216. The adjustable stop 218 defines an axial length along which the prewinder 214 is able to travel relative to the mandrel 216. As a result, the depth that the helical coil insert 232 is installed is controlled and may be varied as particular design requirements dictate.

Figure 6:
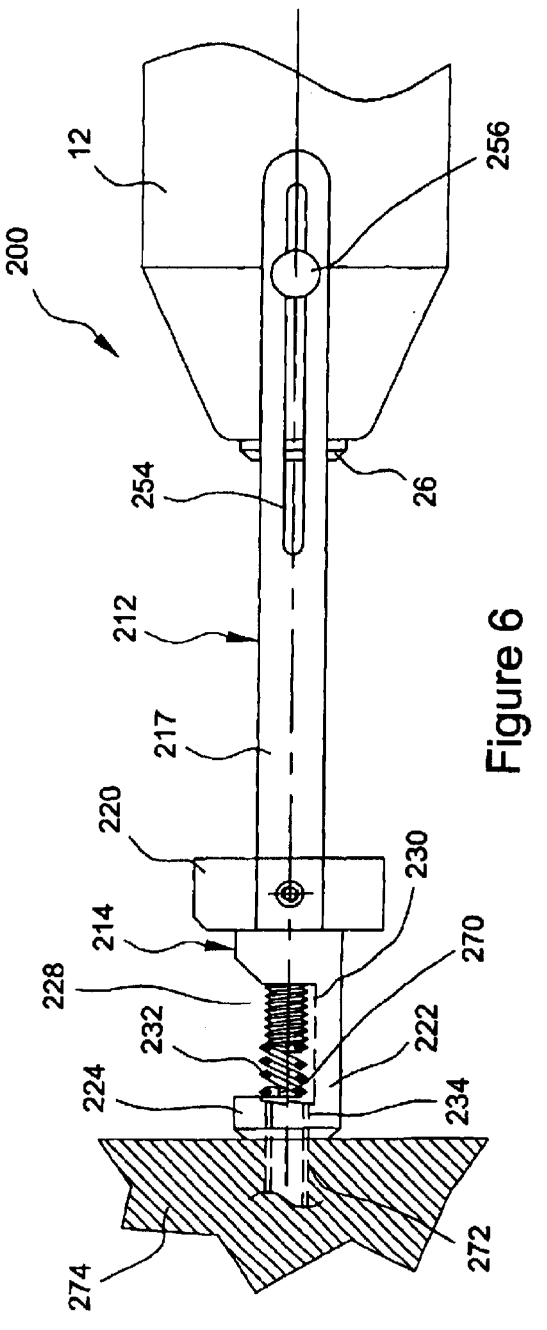
FIG. 6 is a side view of the stationary-mandrel prewinder apparatus of FIG. 3 during a prewinding operation.

With particular reference to FIG. 6, operation of the prewinder apparatus 200 will be described in detail. The helical coil insert 232 is placed within the semi-circular recess 230 of the semi-cylindrical intermediary 222 through the slot 228 and is aligned with the prewinder aperture 234 of the leading end 224 of the prewinder 214. To accommodate loading of the helical coil insert 232 into the prewinder 214, initially, the prewinder 214 and attached bracket assembly 212 are forwardly advanced along the threaded leading end 238 of the mandrel 216. Subsequent actuation of the drive tool 12 causes the drive unit 26 to rotatably drive the mandrel 216. As the mandrel 216 rotates, the threaded engagement with the first threaded aperture 226 of the foot 220 causes the prewinder 214 and attached bracket assembly 212 to be drawn toward the drive tool 12, thereby enabling the mandrel 216 to engage the helical coil insert 232. As the prewinder 214 and attached bracket assembly 212 rearwardly advance, the bracket assembly 212 slides axially relative to the drive tool 12 via the slots 254. Upon engagement, the threaded leading end 238 of the mandrel 216 axially moves through the helical coil insert 232 until the contour 242 grabs a tang 270 of the helical coil insert 232. The mandrel 216 rotates the helical coil insert 232 into the prewinder aperture 234 of the leading end 224, thereby contracting the helical coil insert 232 about the threaded leading end 238 of the mandrel 216. Continued advancement of the prewinder 214 and attached bracket assembly 212 causes the mandrel 216 to rotate the pre-wound, helical coil insert 232 from the prewinder aperture 234 into a threaded bore 272 of a work piece 274. Upon complete insertion of the helical coil insert 232 within the threaded bore 272, the driving action of the drive tool 12 is reversed to disengage the contour 66 from tang 106 and advance the prewinder 214 and attached bracket assembly 212 forward, relative to the drive tool 12, thereby withdrawing the mandrel 216 from the helical coil insert 232 and the threaded bore 272.

Figure 7:
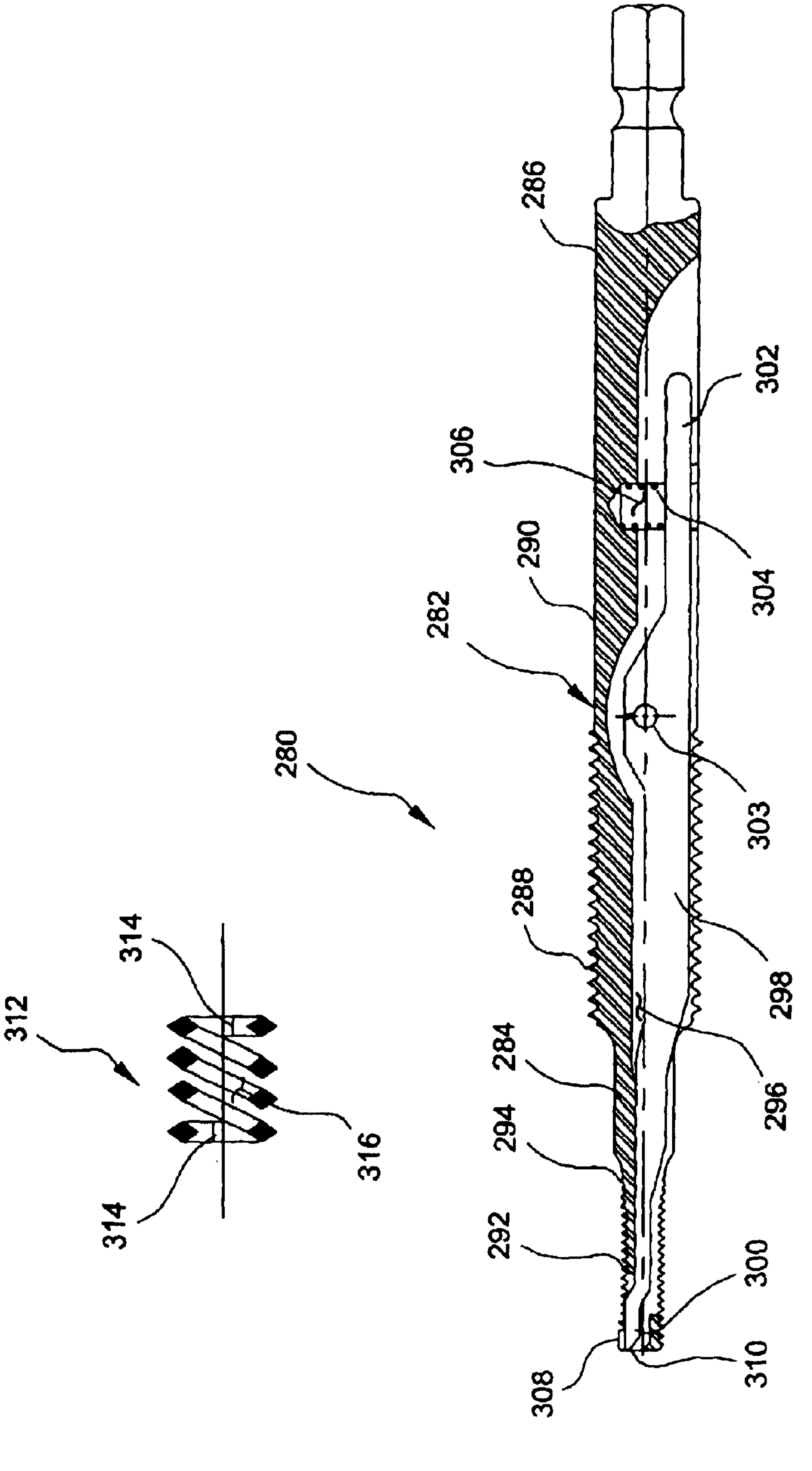
FIG. 7 is a cross-sectional view of an alternative mandrel for use with a tangless helical coil insert.

The above-described mandrels are generally provided for prewinding helical coil inserts having a tang. With reference to FIG. 7, an alternative mandrel 280 is provided for prewinding tang-less helical coil inserts. It will be appreciated that the mandrel 280 may be implemented in either prewinder apparatus 10,200. The mandrel 280 includes a cylindrical body 282 having a stepped end 284 of a reduced diameter and a coupling end 286 for selective interconnection with either the drive sleeve 20 or the drive unit 26.

A first threaded portion 288 is provided about a circumferential surface 290 of the cylindrical body 282 and a second threaded portion 292 is provided about a circumferential surface 294 of the stepped end 284. A cavity 296 is disposed through a length of the cylindrical body 282 and a lever arm 298 is pivotally supported therein. The lever arm 298 includes an engagement end 300, a biasing end 302 and a fulcrum 303 disposed therebetween. A spring 304 is disposed within a cavity 306 of the cylindrical body 282 and engages the biasing end 302 of the lever arm 298 for biasing the lever arm 298 in a first position. When in the first position, a tab 308 of the engagement end 300 extends through an aperture 310 of the stepped end 284.

The first threaded portion 288 of the mandrel 280 is in threaded engagement with the first threaded aperture 52,226 of the prewinder 16,214 and the second threaded portion 292 is in selective engagement with a tang-less helical coil insert 312 for driving the helical coil insert 312 through the prewinder aperture 59,234. The tang-less helical coil insert 312 includes a recess 314 formed in an internal circumferential surface 316. It should be noted that the recess 314 can be formed at either end for providing a bi-directional helical coil insert 312. As the mandrel 280 is driven into contact with the helical coil insert 312, the stepped end 284 threadedly engages the internal circumferential surface 316 thereof. Initially, the tab 308 of the engagement end 300 is pressed downward into the cavity 296, thereby causing the lever 298 to pivot against the bias of the spring 304. As the stepped end 284 of the mandrel 280 is driven deeper within the helical coil insert 312, the spring 304 biases the tab 308 outward against the internal circumferential surface 316 until the tab 308 ultimately slides into engagement with the recess 314. Once engaged with the recess 314, the mandrel 280 rotatably drives the helical coil insert 312 through the prewinder aperture 59,234 and into the work piece 110,274.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A prewinder apparatus selectively attachable to a drive tool for prewinding a helical coil insert, the prewinder apparatus comprising:

a support structure selectively attachable to the drive tool;

a prewinder attached to an end of said support structure, said prewinder including a first threaded aperture;

a mandrel having a threaded end and a coupling end, wherein said threaded end is in selective threaded engagement with said first threaded aperture;

a drive sleeve disposed about the mandrel, said drive sleeve having an adjustable first stop and a second stop configured to regulate the movement of the mandrel; and wherein said coupling end is in selective operable engagement with the drive tool, whereby the drive tool rotatably drives said mandrel relative to said prewinder for rotatably driving the helical coil insert through the second threaded aperture to prewind the helical coil insert.

2. The prewinder apparatus of claim 1, wherein said prewinder further includes an opening for receiving the helical coil insert.

3. The prewinder apparatus of claim 1, wherein the mandrel includes a first threaded portion and a second threaded portion.

4. The prewinder apparatus of claim 3, wherein the first and second threaded portions differ in thread type.

5. The prewinder apparatus of claim 3, wherein said first threaded portion is in selective threaded engagement with said first threaded aperture.

6. The prewinder apparatus of claim 1, wherein said support structure is fixed relative to the drive tool and said mandrel is reciprocally driven by the drive tool within the prewinder apparatus.

7. The prewinder apparatus of claim 1, wherein the drive sleeve including a main body having a coupling stem in selective engagement with the drive tool and a cavity for slidably receiving said coupling end of said mandrel therein, said coupling end including a radially extending pin slidably disposed within a slot running along a length of said drive sleeve, wherein said drive sleeve is rotatably driven by the drive tool for reciprocally driving said mandrel within the prewinder apparatus.

8. The prewinder apparatus of claim 7, wherein the first stop is disposable along said length of said drive sleeve and is configured to regulate a driving distance of said mandrel as whithin said drive sleeve.

9. The prewinder apparatus of claim 8, wherein said first stop includes a ring disposable about said drive sleeve, an inwardly extending guide slidably disposed within said slot and a radially adjustable set screw for fixing said first stop at a predefined distance along said length of said drive sleeve.

10. The prewinder apparatus of claim 8, further comprising a second stop disposable along said length of said drive sleeve for defining a driving distance of said mandrel within said drive sleeve in cooperation with said first stop.

11. The prewinder apparatus of claim 10, wherein said second stop includes a ring disposable about said drive sleeve, an inwardly extending guide slidably disposed within said slot and a radially adjustable set screw for fixing said first stop at a predefined distance along said length of said drive sleeve.

12. The prewinder apparatus of claim 1, wherein said prewinder further comprises a second threaded aperture in threaded engagement with said helical coil.

13. An electric installation tool for installing a helical coil insert, the electric installation tool comprising:

a drive tool; and a prewinder apparatus selectively attachable to said drive tool, said prewinder apparatus comprises:

a prewinder including a first threaded aperture;

a mandrel in selective threaded engagement with said first threaded aperture;

a drive sleeve disposed about the mandrel, said drive sleeve having an adjustable first stop and a second stop configured to regulate the movement of the mandrel; and wherein said prewinder apparatus is in selective operable engagement with said drive tool, whereby said drive tool rotatably drives said mandrel relative to said prewinder for rotatably driving the helical coil insert through the second threaded aperture to prewind the helical coil insert.

14. The electric installation tool of claim 13, wherein said prewinder further includes an opening for receiving the helical coil insert.

15. The electric installation tool of claim 13, wherein said mandrel includes a threaded end.

16. The electric installation tool of claim 13, wherein said threaded end includes a first threaded portion and a second threaded portion.

17. The electric installation tool of claim 16, wherein the first and second threaded portions differ in thread type.

18. The electric installation tool of claim 16, wherein said first threaded portion is in selective threaded engagement with said first threaded aperture.

19. The electric installation tool of claim 13, further comprising a support structure selectively attachable to said drive tool and supporting other components of said prewinder apparatus.

20. The electric installation tool of claim 13, wherein said mandrel is reciprocally driven by said drive tool within said prewinder apparatus.

21. The electric installation tool of claim 13, wherein the drive sleeve includes a main body having a coupling stem in selective engagement with said drive tool and a cavity for slidably receiving an end of said mandrel therein, said end including a radially extending pin slidably disposed within a slot running along a length of said drive sleeve, wherein said drive sleeve is rotatably driven by said drive tool for reciprocally driving said mandrel within said prewinder apparatus.

22. The electric installation tool of claim 21, wherein the first stop disposable along said length of said length of said drive sleeve and is configure to regulate driving distance of said mandrel within said drive sleeve.

23. The electric installation tool of claim 22, wherein said first stop includes a ring disposable about said drive sleeve, an inwardly extending guide slidably disposed within said slot and a radially adjustable set screw for fixing said first stop at a predefined distance along said length of said drive sleeve.

24. The electric installation tool of claim 22, wherein the second stop is adjustably disposable along said length of said drive sleeve for defining a driving distance of said mandrel within said drive sleeve in cooperation with said first stop.

25. The electric installation tool of claim 24, wherein said second stop includes a ring disposable about said drive sleeve, an inwardly extending guide slidably disposed within said slot and a radially adjustable set screw for fixing said first stop at a predefined distance along said length of said drive sleeve.

26. The electric installation tool of claim 13, wherein said helical coil is in threaded engagement with a second aperture of said prewinder.

* * * * *

UNITED STATES PATENT AND TRADEMARK OFFICE

CERTIFICATE OF CORRECTION

PATENT NO. : 6,704,984 B2
DATED : March 16, 2004
INVENTOR(S) : Jan Szewc et al.

It is certified that error appears in the above-identified patent and that said Letters Patent is hereby corrected as shown below:

Column 7,
Line 38, after “first” insert -- and a second --.

Column 8,
Line 2, “including” should be -- includes --.
Line 13, “as whithin” should be -- within --.
Line 38, “a first threaded aperture” should be -- first and second threaded apertures --.
Line 57, “threaded end” should be -- mandrel --.

Column 9,
Line 14, after “stop” insert -- is --.
Line 14, (second occurrence), delete “said length of”.
Line 15, “configure” should be -- configured --.
Line 15, after “regulate” insert -- a --.

Signed and Sealed this

Twenty-fifth Day of January, 2005

JON W. DUDAS
*Director of the United States Patent and Trademark Office*